United States Patent [19]

Britten

[11] Patent Number: 5,578,154
[45] Date of Patent: Nov. 26, 1996

[54] METHOD OF MANUFACTURING A SPOKED WHEEL

[76] Inventor: John K. Britten, 48 Matai Street, Christchurch 8001, New Zealand

[21] Appl. No.: 256,002

[22] PCT Filed: Sep. 13, 1994

[86] PCT No.: PCT/NZ93/00085

§ 371 Date: Jun. 20, 1994

§ 102(e) Date: Jun. 20, 1994

[87] PCT Pub. No.: WO94/06619

PCT Pub. Date: Mar. 31, 1994

[30] Foreign Application Priority Data

Sep. 14, 1992 [NZ] New Zealand ............... 244317

[51] Int. Cl.⁶ .................................. B29C 53/56
[52] U.S. Cl. ............. 156/172; 29/894.331; 156/154; 156/161; 156/182; 156/250; 264/258; 301/56; 301/58
[58] Field of Search ............ 156/172, 162, 156/161, 160, 154, 182, 250; 264/137, 138, 257, 258, 250, 162, 234; 301/55, 56, 58, 59; 29/894.33, 894.331, 894.341, 894.343

[56] References Cited

U.S. PATENT DOCUMENTS

| | | | |
|---|---|---|---|
| 3,977,273 | 8/1976 | Ernst et al. ............... | 156/172 |
| 4,205,800 | 6/1980 | Melan et al. ............... | 242/18 A |
| 4,376,669 | 3/1983 | Math ....................... | 156/162 |
| 4,419,908 | 12/1983 | Reikowski ................ | 264/137 |
| 4,460,531 | 7/1984 | Harris et al. ............. | 264/138 |
| 4,584,226 | 4/1986 | Vitale et al. ............. | 428/105 |
| 4,681,647 | 7/1987 | Kondo et al. ............. | 156/172 |
| 4,708,298 | 11/1987 | Allard et al. ............. | 242/25 A |
| 4,741,223 | 5/1988 | Kondo et al. ............. | 156/172 |
| 4,849,037 | 7/1989 | Kondo et al. ............. | 264/258 |
| 5,064,250 | 11/1991 | Yashiro et al. .......... | 301/55 |
| 5,273,819 | 12/1993 | Jex ........................ | 264/177.2 |

FOREIGN PATENT DOCUMENTS

| | | | |
|---|---|---|---|
| 0354868 | 2/1990 | European Pat. Off. . | |
| 2636386 | 3/1990 | France . | |
| 2411429 | 9/1974 | Germany . | |
| 61-163835 | 7/1986 | Japan .................. | 264/257 |
| 2004835 | 4/1979 | United Kingdom . | |

*Primary Examiner*—Robert Davis
*Attorney, Agent, or Firm*—Ross, Ross & Flavin

[57] ABSTRACT

The present invention provides a method of manufacturing structural components for any type of vehicles and other devices, in particular cars and motorcycles, where the components can operate under compressive and/or extensive stress or successive repetitions thereof, in which method two or more spools in a fixed, predetermined spatial placement, are used as starting elements, with the formation of rigid rods of yarn therebetween, the rods being built up by the winding of the yarn around and between the spools to form a component which may be in either finished or unfinished form.

5 Claims, 5 Drawing Sheets

METHOD OF MANUFACTURING A SPOKED WHEEL

TECHNICAL FIELD

The present invention provides a method of manufacturing structural components for, for example, vehicles (in particular cycles, motor-cycles and cars) and other devices the components of which operate under compressive and/or extensive stress and/or successive repetitions of either or both types of stress. The best examples of this are wheels for such vehicles or components for attachment to an engine.

The method of the present invention may also be used for the manufacture of components that are not structural or where the structural nature of the component is not the only function of the component, eg. motor vehicle chassis.

BACKGROUND ART

One of the present problems with the manufacture of general structural components of the types outlined above is obtaining reasonable strength under stress and extension and repetitions thereof, at an appropriate weight, or at a weight which is acceptable for the component in question. Also, very light components can often be manufactured, but the cost is unacceptably high for the given application.

European patent 438792 discloses a method of making flexible beams and helicopter rotor blades and similar components. In this method, a composite material roving is wound in a figure of eight around a mandrel, the mandrel being rotated so that the roving forms a tubular mesh around the mandrel. Thus, the component is formed as a mesh made of overlapping rovings which are supported upon a mandrel during the forming process.

U.S. Pat. No. 3,367,586 and European patent 284497 disclose filament winding machines broadly similar to that disclosed in European patent 438792, in which a roving is wound in a substantially helical pattern around a mandrel.

European patent 213816 discloses the making of a tube or rod by wrapping a filamentary material impregnated with a matrix material in a first helical layer around a former, second and subsequent helical layers being built up around the inner layers, with each succeeding layer being at a different angle to the immediately preceding and immediately succeeding layers.

In all of the above prior art specifications, it is note worthy that the rovings or yarns or filaments which are used are always wrapped around a mandrel, so that the roving is fully supported during the forming process. Further, the articles that are formed by the above described prior art techniques are formed by a plurality of differently directed layers of windings i.e. the desired shape basically is outlined as a mesh of rovings.

In contrast, the method of the present invention permits the formation of relatively complex shapes without the use of mandrels and provides for the formation of components as solid plates or rods rather than mesh constructions. It follows that the method of the present invention is able to provide for the manufacture of structural components which are very light but exceptionally strong, by a method of manufacture which can readily be automated and which, compared to the prior art methods, is relatively simple and rapid to perform.

A further object of the invention is the provision of such structural components produced by this method. A still further object of the invention is the provision of apparatus for use in the above-described process to produce said structural components.

DISCLOSURE OF INVENTION

The present invention provides a method of manufacture of structural and other components, said method including:

predetermining the number of axes and spools (as hereinafter defined) and the spatial placement of said spools, relative to one another, required in the finished component;

providing means to arrange and secure said spools in the predetermined spatial placement; using said means;

predetermining the thickness of material required between any two spools depending on the purpose to which the component is to be put, for all spools;

providing means for wetting yarn in a preselected resin;

providing means to wind said wetted yarn, under a predetermined tension, from spool to spool on a predetermined path, said winding building up the said thickness of material to form unsupported rods of wetted yarn between spools;

using said means;

curing said component in known manner but such that every rod of material is under tension during said curing, the temperature of said curing being determined by the materials used and the intended use of the component; and removing said component from the arrangement and securement means once curing is completed and each said rod is rigid.

As used herein, the term "yarn" means a plurality of fine lengths of filament formed into a bundle which is coherent under tension. Typically, carbon or boron or glass filaments are used, but aramid resins in the form of synthetic fibres or steel filaments may also be used.

To form a solid, rigid, component, the yarn is wetted with a suitable matrix material and the yarn/matrix composite solidifies as matrix dries. The matrix material fills the spaces between the filaments and interconnects them.

Matrix materials may be selected from wide range of known materials, depending upon the end-use of the component to be manufactured. Typical matrix materials include epoxy resins, polyester resins, and vinyl ester resins, plus a range of other known resins.

A spool is a component which includes a top, a side and a bottom, the external shape of the spool can be symmetrical about the longitudinal axis through the top and the bottom. The spool may include a locating means. The top and bottom of the spool may be circular or arcuate in cross-section, but preferably are square or multi-sided so that rotation of the spool can be easily controlled. The spool may be a pin i.e. of uniform width throughout its length or may be shaped so that the cross-sectional area through the middle of the spool is generally less than that of the top or that of the bottom. The top and the bottom need not be identical.

Preferably the locating means includes one or more holes. Preferably at least one hole is circular in cross-section. Also preferably the longitudinal axis of a spool passes through or touches at least one hole.

A spool may also include one or more intermediate flanges the cross-section of which is approximately the same as that of the top or the bottom. This allows a spool to be used for winding yarn therearound (as hereinafter described) in more than one direction.

The number of spools is calculated by determining the number of different axes the yarn needs to be wound around to form the component.

The present invention further provides arrangement and securement means which includes a jig, wherein said jig includes a base and two or more pedestals of the same or differing heights above said base, said pedestals being secured to said base and providing means to releasably locate or secure a spool thereon; the spacing of said pedestals and any difference in height of said spools, when secured on each pedestal, being the same spatial placement as described in the above method.

Preferably said jig is of steel so that the when the rods are cured, the tension under which the rods are cured includes the tension provided by the expansion of the steel when heated in the curing oven.

The winding means can be manual or may be completely automatic, being mechanically automated or robotically wound and controlled by an appropriately programmed computer.

The method of manufacture of the present invention may further provide the inclusion of additional spools in the above method where the purpose of said additional spools is solely to change the direction of the yarn as it is being wound.

The method of manufacture may further include the step of post-curing the component after further yarn or other material has been added to the component.

The method of manufacture may further include the step of providing pre-moulded coverings to cover the finished product of the above method.

The present invention also provides a structural component produced by the method of manufacture described above.

BRIEF DESCRIPTION OF THE INVENTION

By way of example only, a preferred embodiment of the present invention will be described in detail with reference to an engine mounting bracket for the suspension on a motorcycle and the construction of a motorcycle wheel and to the accompanying drawings, in which.

MODE FOR CARRYING OUT THE INVENTION

Figures 1, 2:
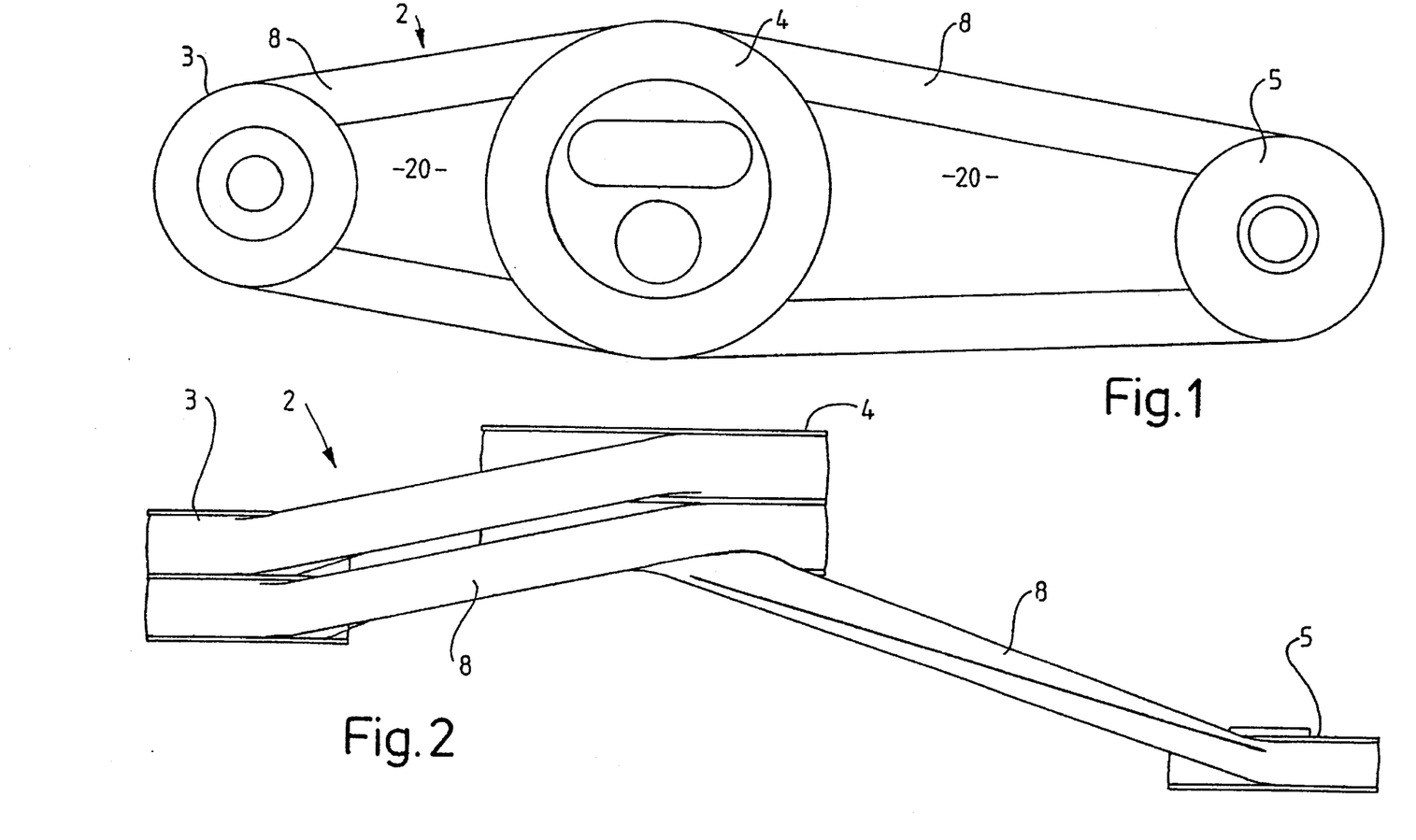
FIG. 1 is a plan view of an engine mounting bracket showing one stage of the preferred embodiment of the method of the present invention.
FIG. 2 is a side view of the bracket shown in FIG. 1.
Figure 3:
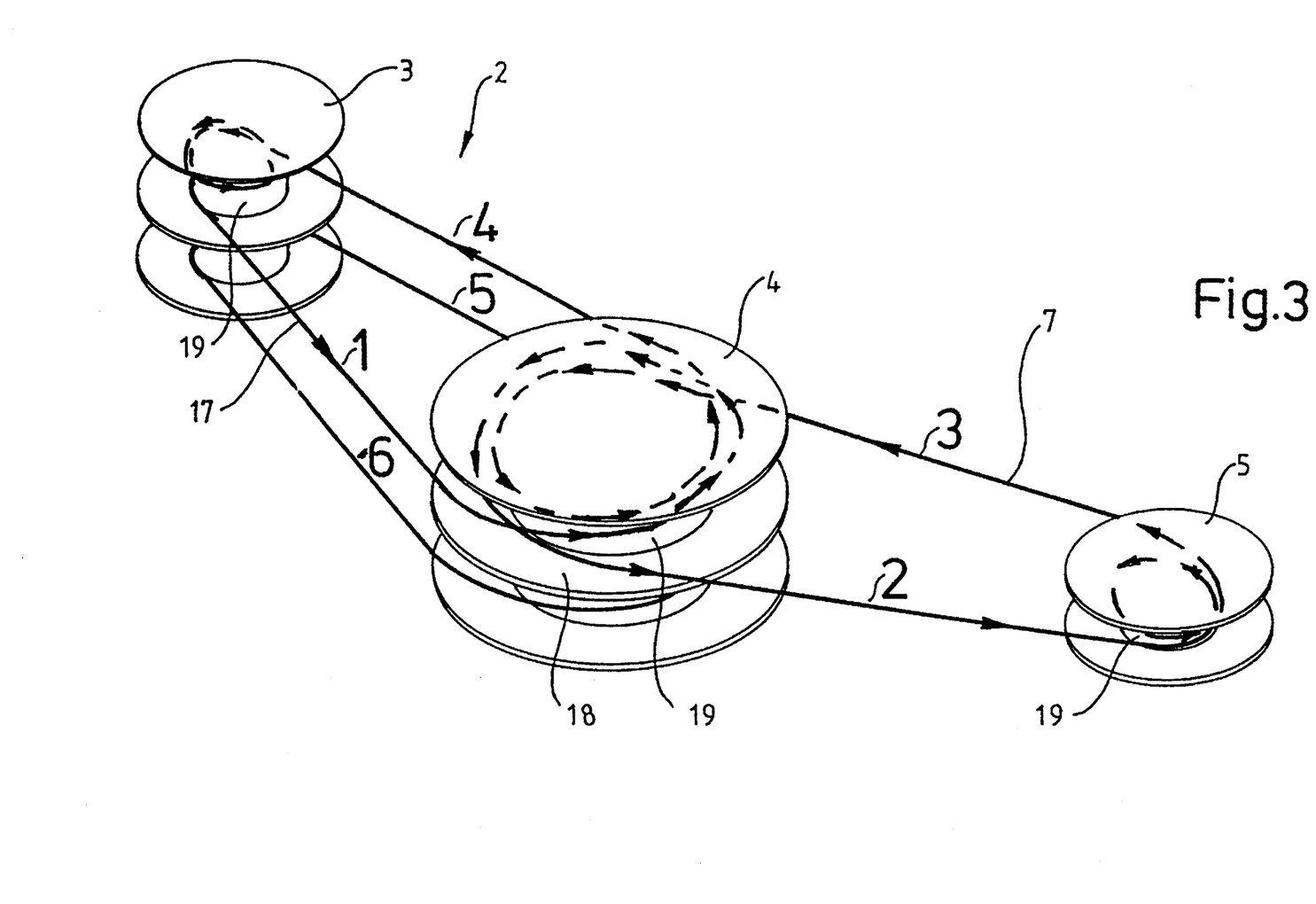
FIG. 3 is a perspective sketch showing part of the method of the preferred embodiment of the present invention with reference to an engine mounting bracket.

Referring to FIGS. 1, 2 and 3 a motor bike component 2, an engine mounting bracket, is thereshown and includes three spools (3, 4 and 5) with a circular hole therethrough. The placement of the spools 3–5 in spatial relation to one another will depend on the particular purpose of the component 2 and whereabouts the component 2 bolts to other items on a motor cycle. In the example shown in the first three figures, the middle spool 4 is of a different diameter to the outer spools 3, 5 and has a slotted hole in addition to the circular hole. These holes can be relevant to purposes other than its manner of construction. The holes in the spools 3–5 are also used to mount the spools on the jig 6 (as shown in FIG. 4).

All spools 3–5 may be made from any appropriate material, eg. carbon fibre, plastics, coated aluminium or any material which is noncorrosive with carbon fibre. For preference all spools 3–5 are made of aluminium unless they are required to be mounted to an engine or to be put to some other specific purpose where extra strength is required. In this case the spools 3–5 may be of steel or some other appropriate metal. The exterior of the shaft 19 of the spools 3–5 has suitable sized grooves therealong to receive a calculated amount of carbon fibre yarns 17. The spools 3–5, if of aluminium, are coated with a layer of an appropriate resin and allowed to partially dry prior to the application of the carbon fibre yarns 17.

The thickened "shaft" of wetted yarns which extends between each pair of adjacent spools (3, 4 or 4, 5) is termed a rod 8 and, once dried and cured, is rigid.

Figure 4:
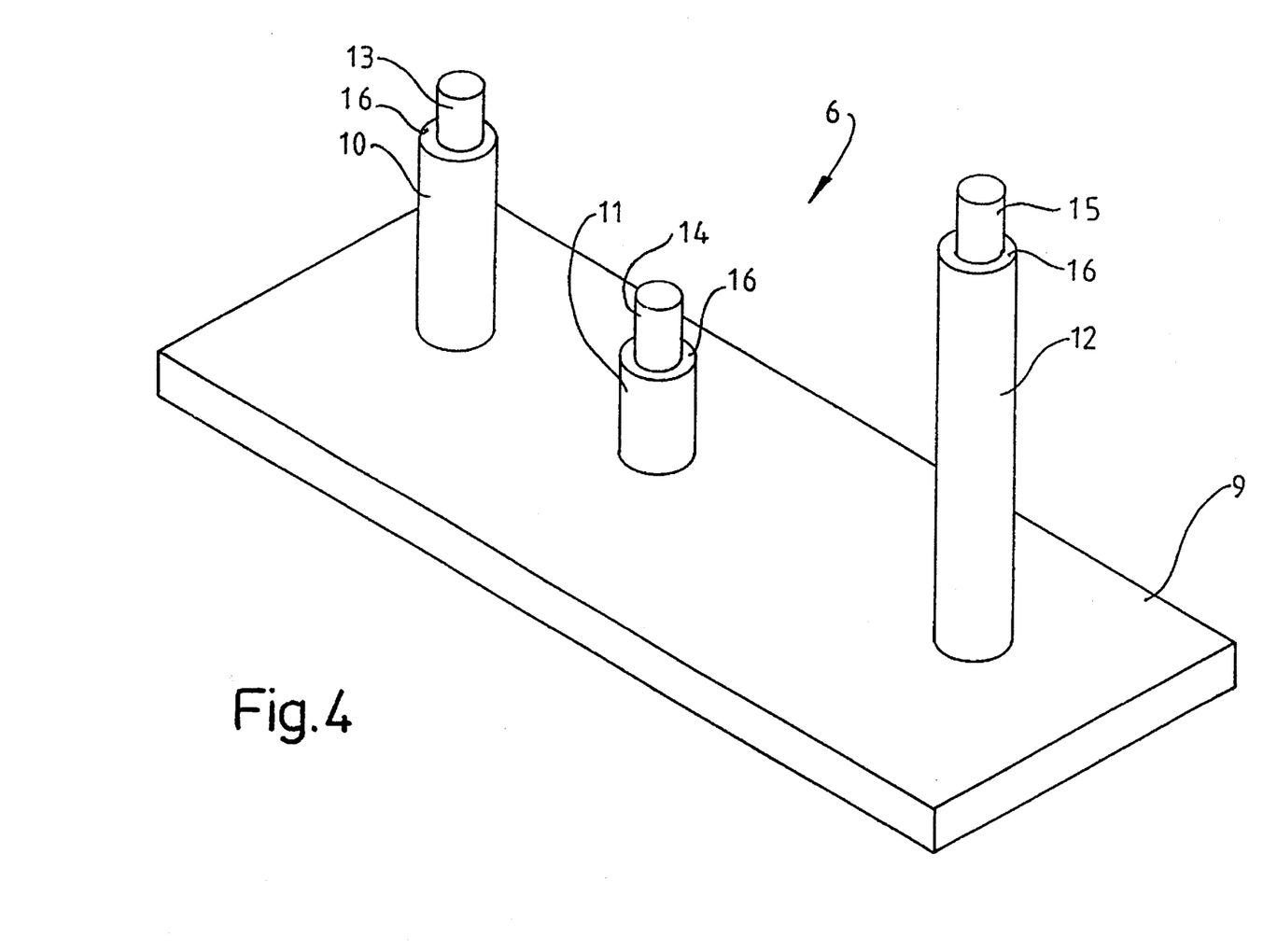
FIG. 4 is a perspective view of a jig used in the preferred embodiment of the method of the present invention.

With reference to FIG. 4, a jig 6 for making component 2 is thereshown. The jig 6, of steel, includes a thick, faced steel plate 9 with pedestals 10–12 secured thereto. The placement of the pedestals 10–12 is calculated from the required spacing between the spools 3–5 to produce component 2. The height of the pedestals 10–12 is determined by the spatial relationship of the spools 3–5 in the finished component 2. Each pedestal 10–12 has a top portion (respectively 13–15) which is circular in cross-section and narrower than the cross-section of the bulk of the respective pedestal (10–12). Thus a flat collar 16 is provided on each pedestal 10–12 for resting the respective spool 3–5 on. The diameter of the top portion 13–15 will depend on the size of the hole in the respective 3–5 spool. The diameter of each top portion 13–15 is such that the respective spool 3–5 is a comfortable and not loose fit on each pedestal 10–12. The fit however should not be as tight as an interference fit.

This construction of jig 6 requires that each spool 3–5 has a hole therethrough. Alternative means of releasably securing each spool 3–5 to the jig 6 may be used if desired. For example, each pedestal 10–12 could include two locating pins and each spool 3–5 could include complementary cavities for locating said pins. Thus the spools 3–5 can be releasably secured for the manufacture of the component 2, but not be required to have a hole therethrough.

The component 2 is manufactured in the following manner: referring to FIG. 3 and 4, the spools 3–5 are placed on the jig 6 on the relevant pedestal 10–12.

A carbon fibre yarn 17 is wetted in a bath of the preselected resin and in wet form is stretched tightly from spool to spool (eg 3 to 4 or 4 to 5). As shown in FIG. 3, the wetted yarn 17 is started on spool 3 in a groove (not shown) on the shaft 19 of spool 3. The yarn 17 is stretched from one side of spool 3 to one side of spool 4 and then turned one complete revolution around spool 4 on its shaft 19. The yarn 17 then continues from the same side of spool 4 to one side of spool 5 and is taken in one complete revolution around the shaft 19 of spool 5. The yarn 17 then goes back on the second side of spool 5 to the second side of spool 4 and in one complete revolution around the shaft 19 of spool 4. The yarn 17 continues from the second side of spool 4 to the second side of spool 3 and for one compete revolution around the shaft 19 of spool 3. Thus, the path taken by the yarn 17, on the initial path, is illustrated in FIG. 3 with the numbers "1, 2, 3 and 4" and the intermediate arrows showing the revolutions around the shaft 19 of each spool 3–5. The yarn 17 is passed continuously over this route until the desired, pre-calculated thickness of yarn 17 required in each rod 8 is reached. Without breaking the yarn 17, the yarn 17 then passes to the next area in which rods 8 are to be built up. In FIG. 3 the yarn 17 thus passes over the intermediate flange 18 of spool 4 down to the lower part of spool 4 and follows paths "5 and 6" around spools 3 and 4 in the manner described above. Thus the rods 8 between spools 3 and 4 only are built up. Once the pre-determined thickness of these rods 8 is reached the yarn 17 is then broken.

Thus one wetted carbon fibre yarn 17 can be used to build up all the rods 8 on component 2.

The thickness of the rods 8 required for the purpose of the component 2 can be precalculated, given the diameter of the yarn 17 and knowledge of its tension and compression strength along with the desired safety load for the component 2. Thus the thickness of the rods 8 required for the purpose of component 2 can be calculated entirely in advance.

In the examples shown, and in practice it has been found carbon fibre yarn 17 of 0.8 mm in diameter formed from approximately 200 filaments, and 100 kg strength under tension and 80 kg strength under compression, gives acceptable results. The safety load required was a 60 kg load with one pass of the yarn 17.

As the yarn 17 is wound around the required course 1–6 (FIG. 3), it is kept under constant tension and stretched tightly from spool to spool. The one complete revolution around each spool 3–5 before a change of direction of yarn 17 is conducted to ensure that when the rods 8 are under a compressive load the spools 3–5 do not pull free of the yarn 17.

If so desired, it is possible to wind a plurality of yarns 17 at one time. However for the required strength to be obtained and for the same tension to be used on each pass of the yarn 17, it has been found in practice that not more than three lengths of yarn 17 can be wound on at any one time.

For maximum effect and maximum strength of the rods 8 each passing of the yarn 17 around a shaft 19 should be under the same tension as every other passing of the yarn 17. Thus if more than two or three yarns 17 are used at any the same time, one yarn 17 may lie over another and a different length of yarn 17 may be required to complete the same path around a shaft 19 when winding the yarn 17 on. This would mean that the outer of the two yarns 17 would be under a slightly different tension from the inner of the two yarns 17, as the outer yarn 17 is at a different radial distance from the centre of the spool in question. Thus, if more than one yarn 17 is wound on at any one time, the yarns must be able to be fed out at different speeds to allow for slight differences in the lengths of the paths followed by the yarns, so that the same tension is maintained on all yarns passing the same point on the component 2. The reason that between one and three are recommended is that the stopping and starting points of the yarns 17 are weak points in the strength of the component 2. Thus, the fewer stop and start points in the yarn 17, the fewer the weak points in the strength of the component 2.

It would however be possible to wind on a multiplicity of yarns 17; for example, starting each yarn 17 at a different point from all others; stopping each yarn 17 at a different point from all others; and ensuring that all routes of all the yarns 17 around all the spools 3–5 were such that the yarns 17 were all under the same tension. Practically, however, this would not be easy. It would require computer control of automatic machinery performing the above-described method.

Once the yarn 17 has been built up to make rods 8 of the required thickness, the entire jig 6 with wet carbon rods 8 is placed in an oven (not shown) for curing. The temperature at which the rods 8 are cured and the length of time for which curing occurs will depend on the purpose to which component 2 is to be put, and upon the particular resin which has been used to wet the yarn.

For example, if the component 2 is to become a wheel, then it is advisable to cure at the highest operating temperature of the wheel. Similarly, if the component 2 is to be put to use as a crank case, then the component 2 should be cured at the highest temperature at which a crank case will be used. This is generally 125° C. Such a component 2 should be cured at that temperature for approximately one and a half hours. If the operating temperature of the component 2 is to be no more than 60°, then the component 2 should be cured at that temperature for a minimum of one and half hours. If the component 2 is to be used at a temperature between 90° and 100°, then the initial curing may be at 60° for a minimum of one and half hours with a further, post-curing period, of one and half hours at between 90° to 100° C. Where the component 2 is not intended to be used at such temperatures, a post-cure may not be required.

The resin which is used to wet the carbon fibre yarn 17 can be a polyester resin (unsaturated thermosetting resin), or an epoxy or vinyl ester resin. Other resins may be used, depending on the final use to which component 2 is to be put. If, for example, the component 2 is required to be fire resistant, then a fire resistant resin must be used.

The use of a steel jig 9 is preferable when making these components 2 as the expansion of the steel in the oven, under temperature, aids in tightening the wet rods 8 to the appropriate tension during the curing process.

The above described method can include the following further steps: a pre-made, cured and faced carbon fibre, moulded shape (not shown) may be placed over the pedestals 10–12 (FIG. 4) of the jig 9, prior to the spools 3–5 being placed on the pedestals 10–12. The pre-made shape would include holes or openings that allow the pedestals 10–12 to protrude through it and would be half of the required moulded shape encasing component 2 for the final finished product of component 2.

Once the wet yarn 17 is wound onto the spools 3–5 to the required thickness for the finished rods 8 (as described above), the moulded shape is slid up the pedestals 10–12 and brought into contact with the wet yarn 17. If the contact between the wet yarn 17 and the pre-made shape is not thorough, a paste of milled fibre or similar product can be used to improve the bond between the wet carbon rods 8 and the pre-made cover. Contact and bonding between rods 8 and cover is important, especially when the rods 8 are long, because this prevents the rods 8 from buckling under compressive loads.

A second, pre-made and faced, moulded cover is then placed over the top of the spools 3–5, touching the top of the wet yarn 17. It is of such a shape that its edge abuts to and over-the first half of the product placed on the pedestal prior to the winding of the yarn 17. The component 2 now includes two moulded covers that cover all the rods 8 of the finished product. If desired, a ribbon shaped patch or other product (not shown) may be used to cover the join line of the two sides of the cover, to add strength to the cover.

The cover is described above as being of carbon fibre. However it may be of any other plastics or aluminium or any material capable of being moulded, and suitable for the purpose to which the component 2 is to be put. The mould for the making of the cover may be made from a prototype of component 2 where the yarn 17 and rods 8 have been made and the prototype of component 2 has been cured. A closed cell foam may be poured into the cavities 20 of the product. The foam may be allowed to harden (FIG. 1) and then finished, to the desired shape, and the completed prototype used as a plug for making the moulds for the covers.

A further, optional, stage of the manufacture of a component 2 may be incorporated after the first curing of the component 2, and without the addition of covers. This additional stage of the method of manufacture may be used where a component has to be made in two stages, for example a wheel.

Figure 5:
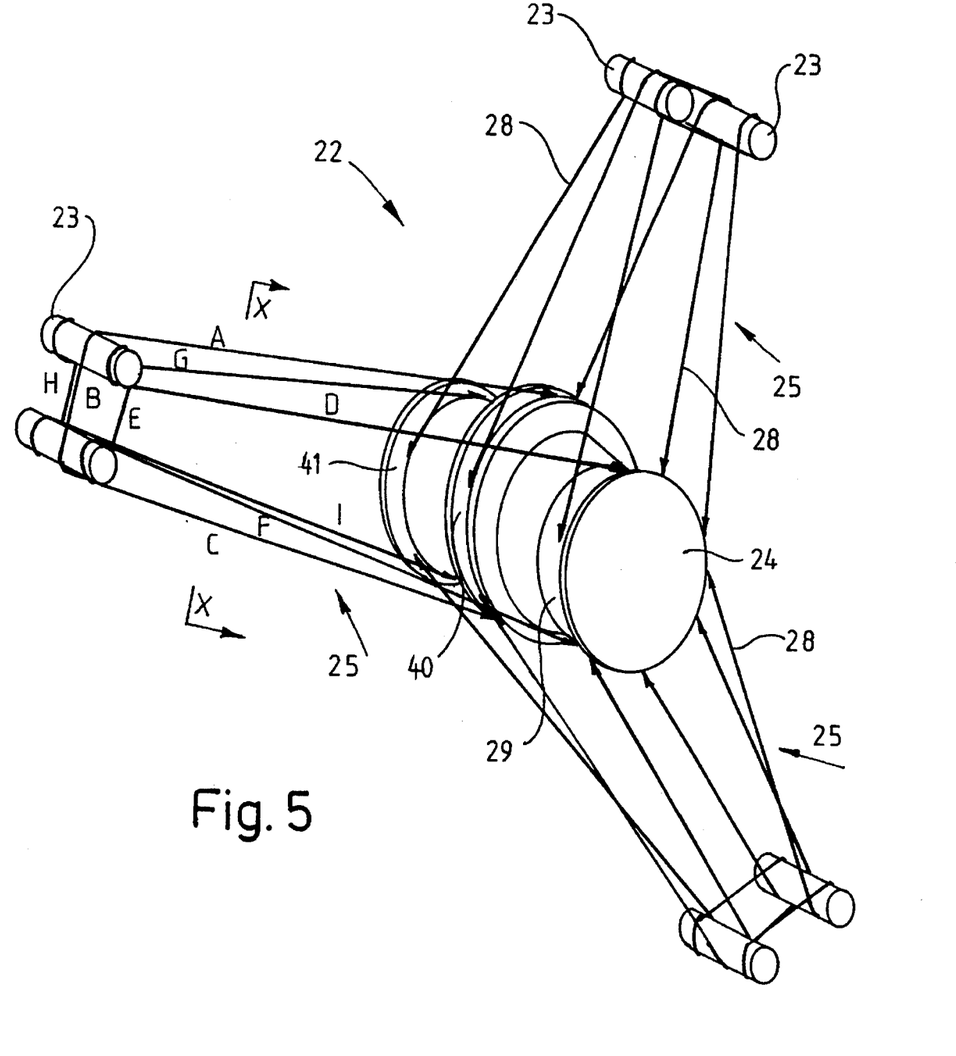
FIG. 5 is a schematic perspective view of the spokes of a wheel at a stage of the method of the present invention.
Figure 6:
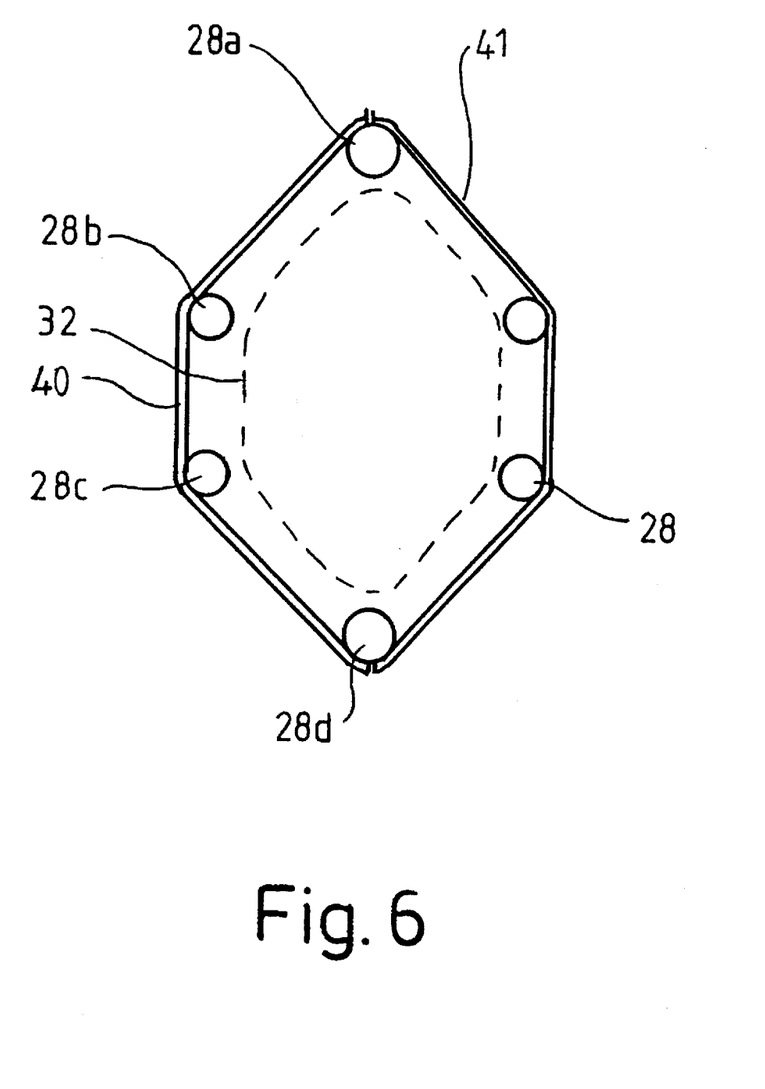
FIG. 6 is a cross-section along the line XX of FIG. 5.

Referring to FIGS. 5 and 6, in a preferred method of manufacture of a wheel 22, the centre of the wheel 22 is formed by a spool 24 and each spoke 25 is formed by a series of carbon-fibre rods 28 made by winding wetted carbon-fibre yarn between the centre spool 24 and a plurality of spaced-apart outer spools, using the method described with reference to FIGS. 1 & 2. Preferably the number of outer spools 23 used is two, with the yarn being wound to form a hexagonal pattern of rods 28 when viewed in a cross-section through the spoke 25. Preferably, the outer spools are positioned on a jig further away from the centre of the wheel than the desired final length of the spoke.

The centre spool 24 has 3 different portions 29, 30 and 31 over which yarn is wound. Outer portions 29 and 31 are adjacent each end of the spool 24; and are of the same diameter. The central portion 30 is between the two outer portions 29 and 31 and has a larger diameter than the outer portions 29, 31.

To form the rods 28 for a spoke, yarn is wound around the central portion 30, and from one side of the central portion 30 over the outer side of one of the outer spools 23, across to the second of the outer spools 23 and back to the second side of the central portion 30. This yarn follows path ABC to form rods 28a and 28d.

Yarn is wound around one outer portion 29, in like manner, following path DEF to form two more rods 28. The last rods 28b and 28c are formed in similar manner, winding yarn around the second outer portion 31 and the outer spools 23, following path GHI.

Prior to the formation of the spokes 28, a pre-moulded half wheel cover 40 may be placed on or about the jig, but clear of the spools 23, 24.

When all the wheel spokes 25 have been formed, and the wheel 22 is still on the jig, with the resin still wet, the half wheel cover 40 is positioned to touch the wet rods 28, to form one side of the wheel 22. The fact that the resin is still wet ensures a good bond between the spokes 28 and the cover 40.

The wheel cover 40 may be made of the same materials, and by the techniques, described with reference to FIG. 1–4. Alternatively, the cover 40 may be made from any other suitable material e.g. plastics materials capable of being die-formed or injection moulded.

The other half wheel cover 41 is then placed over the spokes 28. A cup 32 (shown in dotted outline, FIG. 6) made of carbon fibre is then pushed or press fitted between each set of rods 28 forming the outer end of each spoke 25, so that the outer surface of the cup 32 bonds along the outer parts of the rods 28 and the base of the cup 32 forms an enlarged surface area for the outer end of the spoke 25.

The wheel cover halves 40, 41 are then pressed together. The rods 28 adjacent the edges of the cover halves 40, 41 assist in sealing the edges of the cover halves 40, 41 together, and slowly the second jig is slowly rotated while wetted carbon-fibre cloth or yarn is wound around the rim of the wheel.

Thus the carbon fibre rod 8 structure is used predominantly in the spoke section of the wheel 22 and wet woven carbon fibre cloth is used predominantly for the rim. The wheel 22 is cured/dried in an oven, again as described above. Each wheel spoke 25 is then cut to the desired length, removing the corresponding spools and the excess yarn. The cool wheel is placed in a lathe where the rim section is turned to create an accurate, circular tire bead profile for location of the tire.

The wheel 22 has been described above with reference to the formation of three spokes 25 each having a hexagonal array of rods 28. It will be appreciated that 2 or 4 or more spokes may be formed by the method described. It will also be appreciated that shapes other than hexagonal shapes may be used; also that the shape need not be symmetrical about a plane along the axis of the spoke.

If so desired, an intermediate set of spools (not shown) may be added to form the rods 28 for each spoke 25. Such spools can be used for the attachment of other components to the wheel 22, e.g. disc brakes.

The above method of manufacture has been described with reference to the development and manufacture of component 2. More complicated structures with a multiplicity of spools can also be manufactured by this method. For example, where there is a requirement that a rod 8 change direction, for mechanical strength, a small spool (not shown) can be used for this purpose. Such a spool is later entirely covered by the outside moulding.

A component that contains more than eight spools is entirely possible with this method and a single line of yarn 17 (eg. the spoke of a wheel). The reason for this is that the required thickness of the rods 8 between two particular spools in the component can always be calculated in advance and a most appropriate path for the carbon 17 fibre yarn to follow can thus be predetermined.

The above described component 2 has been described with reference to an engine mounting bracket for a motor cycle and a wheel. Other parts of a motor cycle may be made using the above described method—for example, the front forks, the chassis and other suspension components. It is also possible to make the crank case with this method. It will also be appreciated that cycles, cars or other vehicles (and components of each, including engine components) can also be made using this method.

Whilst the above described method has been described with reference to the manual production of component 2, it will be appreciated that the jig 9 and winding on of the yarn 17 can be automated, and controlled mechanically or by an appropriately programmed computer. It is also possible, with appropriate pre-calculation and selection of the resin use to manufacture pistons and connecting-rods with the above-described method.

I claim:

1. A method of manufacture of a spoked wheel with a center and a longitudinal axis along each spoke and operating under compressive stress or extensive stress or successive repetition of compressive or extensive successive stress, the method including:

placing a spool at the center of the wheel;

for each spoke, arranging and securing a series of spaced outer spools about the longitudinal axis of that spoke, such that the outer spools are spaced a distance from the center spool greater than the final length of the spoke;

predetermining the thickness of material required between any two spools depending on the purpose to which the wheel is to be put, for all spools;

wetting yarn in a preselected resin;

the yarn being of carbon fibre as a major component and as a minor component material filaments selected from the group consisting of: boron, glass, aramid resins in the form of synthetic fibers, steel and any combination thereof;

the yarn being made from filaments formed into a bundle which is coherent under tension and impregnated with a resin selected from the group consisting of: a polyester resin, an epoxy resin and a vinyl resin;

winding sufficient wetted yarn between the center spool and each of the outer spools to form a set of rods about the longitudinal axis of the spoke and under a predetermined tension which is maintained throughout the winding of the yarn, the winding building up the thickness of material to form unsupported rods of wetted yarn between spools and winding the yarn on the predetermined path;

adding pre-moulded half-wheel coverings to cover part or all of the rods in a two stage process, one part of the pre-moulded coverings being adapted to be positioned on the arrangement and securement means for the spools prior to the winding on of any yarn, the second part of the pre-moulded coverings being added immediately after the yarn is wound on and before the curing;

using further yarn to provide a bond between the rods of yarn and the coverings;

inserting a cup, with a base, of the same material as the wetted yarn as a press-fit between the outer ends of the rods, such that an outer surface of the cup bonds to the rods and the base of the cup forms an enlarged surface area at the distance from the center end of the spoke;

pressing the wheel cover halves together;

rotating the arrangement while winding wetted yarn or cloth made of such yarn over the joint between the wheel cover halves, to form a rim of the wheel;

curing the wheel such that every rod of material is under tension during the curing, the temperature of the curing being determined by the material of the yarn and the coverings;

removing the wheel once curing is completed and each rod is rigid; and cutting the rods forming each wheel spoke to a desired spoke length.

2. A method of manufacture of a wheel as claimed in claim 1 wherein the method further includes the steps of machining the rim of the wheel to form an accurate, circular tire bead profile.

3. In a method of manufacture of a spoked wheel operable under compressive stress or extensive stress or a successive repetition of compressive or extensive stress, including the steps of:

predetermining the number greater than two of axes and spools and the non-planar spatial placement of the spools as to each other as required for the spoked wheel, arranging and securing the spools in the predetermined spatial placement with a spool at the center of the wheel;

for each spoke, arranging and securing a series of spaced outer spools about the longitudinal axis of that spoke, such that the outer spools are spaced a distance from the center spool greater than the final length of the spoke;

predetermining the requisite thickness of material between any two spools according to the purpose of the spoked wheel, wetting yarn in a preselected resin, winding the wetted yarn from spool to spool and around each spool along a predetermined path and while under a constant predetermined tension and while building a thickness of material to form unsupported rods of wetted yarn between the spools about the longitudinal axis of the spoke;

covering part or all of the rods with pre-moulded coverings, establishing a bond between the rods and the coverings with additional yarns, placing pre-moulded half-wheel covers over the wet yarns;

inserting a cup, with a base, of the same material as the wetted yarn as a press-fit between the outer ends of the rods, such that an outer surface of the cup bonds to the rods and the base of the cup forms an enlarged surface area at the end of the spoke distant from the center;

pressing the wheel cover halves together;

rotating the arrangement and securement means while winding wetted yarn or cloth made of such yarn over the joint between the wheel cover halves, to form a rim of the wheel;

curing the wheel; and cutting the rods forming each wheel spoke to a desired spoke length.

4. In a method of manufacture of a spoked wheel with a center and a longitudinal axis along each spoke and operable under compressive stress or extensive stress or a successive repetition of compressive or extensive stress, including the steps of:

predetermining the number greater than two of axes and spools and the non-planar spatial placement of the spools as to each other as required for the spoked wheel, arranging and securing the spools in the predetermined spatial placement with a spool at the center of the wheel, for each spoke, arranging and securing a series of spaced outer spools about the longitudinal axis of that spoke, such that said outer spools are spaced a distance from said center spool greater than the final length of said spoke;

predetermining the requisite thickness of material between any two spools according to the purpose of the spoked wheel, wetting yarn in a preselected resin, winding the wetted yarn between the center spool and each of the outer spools along a predetermined path and while under a constant predetermined tension and while building a thickness of material to form unsupported rods of wetted yarn between the spools, covering part or all of the rods with pre-moulded coverings, establishing a bond between the rods and the coverings with additional yarns, inserting a cup, with a base, of the same material as the wetted yarn as a press-fit between the outer ends of said rods, such that an outer surface of the cup bonds to the rods and the base of the cup forms an enlarged surface area at the end of the spoke distant from the center;

pressing the wheel cover halves together;

rotating the arrangement and securement means while winding wetted yarn or cloth made of such yarn over the joint between said wheel cover halves, to form a rim of the wheel;

curing the wheel while the rods are under tension and at a temperature as predetermined by the material of the yarn and of the coverings; and cutting the rods forming each wheel spoke to a desired spoke length.

5. The method of manufacture as claimed in claim 4 wherein said method is carried out under fully automated conditions.

* * * * *